United States Patent
Tzeng et al.

(10) Patent No.: US 8,363,429 B2
(45) Date of Patent: Jan. 29, 2013

(54) DIGITAL DYNAMIC DELAY MODULATOR AND THE METHOD THEREOF FOR FLYBACK CONVERTER

(75) Inventors: Ren-Huei Tzeng, Taipei (TW); Jan-He Li, Taipei (TW)

(73) Assignee: Neoenergy Microelectronics, Inc., Chupei, Hsinchu County (TW)

( * ) Notice: Subject to any disclaimer, the term of this patent is extended or adjusted under 35 U.S.C. 154(b) by 192 days.

(21) Appl. No.: 13/013,364

(22) Filed: Jan. 25, 2011

(65) Prior Publication Data

US 2011/0299305 A1    Dec. 8, 2011

(30) Foreign Application Priority Data

Jun. 7, 2010   (TW) ............................... 99118400 A (51) Int. Cl.
*H02M 3/335*    (2006.01)
(52) U.S. Cl. ................ 363/21.03; 363/21.13; 363/21.18
(58) Field of Classification Search ............... 363/21.02, 363/21.03, 21.05, 21.1, 21.11, 21.12, 21.13, 363/21.16, 21.18, 97, 131; 323/283
See application file for complete search history.

(56) References Cited

U.S. PATENT DOCUMENTS

| | | | |
|---|---|---|---|
| 5,986,897 A | 11/1999 | Majid et al. | |
| 7,151,681 B2 * | 12/2006 | Yang et al. | 363/21.13 |
| 7,394,670 B2 | 7/2008 | Koike | |
| 7,426,120 B2 | 9/2008 | Yang et al. | |
| 7,466,569 B2 | 12/2008 | Yang et al. | |
| 7,768,802 B2 * | 8/2010 | Lee et al. | 363/21.16 |
| 7,957,162 B2 * | 6/2011 | Choi et al. | 363/21.13 |
| 8,098,502 B2 * | 1/2012 | Mao et al. | 363/21.03 |
| 8,144,486 B2 * | 3/2012 | Moon et al. | 363/21.12 |

* cited by examiner

*Primary Examiner* — Gary L Laxton
(74) *Attorney, Agent, or Firm* — Muncy, Geissler, Olds & Lowe, PLLC (57) ABSTRACT

A digital dynamic delay modulator and the method thereof are applied to a flyback converter. A first input voltage signal from the flyback converter is received and compared with a threshold voltage to determine whether a counting condition is matched. When the counting condition is matched, an integer predetermined count number is counted to determine a delay time. After finishing the counting, a first output signal is generated to turn on a switching device for the flyback converter. The slope of the first input voltage signal is detected when the switching device is turned on, and the slope is used to adjust the count number with integer increment/decrement. Therefore, the delay time for switching the flyback converter can be precisely controlled in digital and dynamic manner.

14 Claims, 6 Drawing Sheets

DIGITAL DYNAMIC DELAY MODULATOR AND THE METHOD THEREOF FOR FLYBACK CONVERTER

BACKGROUND OF THE INVENTION

1. Field of the Invention

The present invention relates to power electronics, especially to an apparatus and a method for precise valley detection in quasi-resonant (QR) flyback converters.

2. Description of Prior Art

Flyback converters are extensively employed in low-power conversion applications due to the advantages of low cost and simple architecture. More specifically, quasi-resonant (QR) flyback converters can enhance the system performance without increasing system complexity and elements used. Therefore, QR flyback converters are advantageous in economic and environmental aspects.

Figure 1:
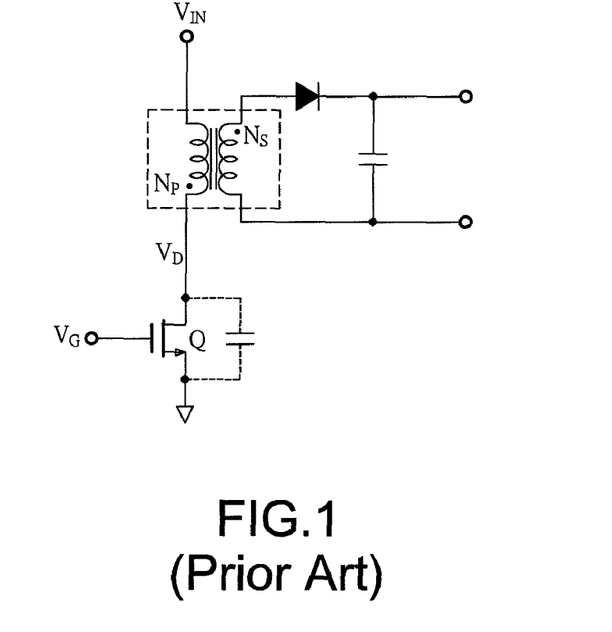
FIG. 1 shows a schematic view of a prior art QR flyback converter.
Figure 2:
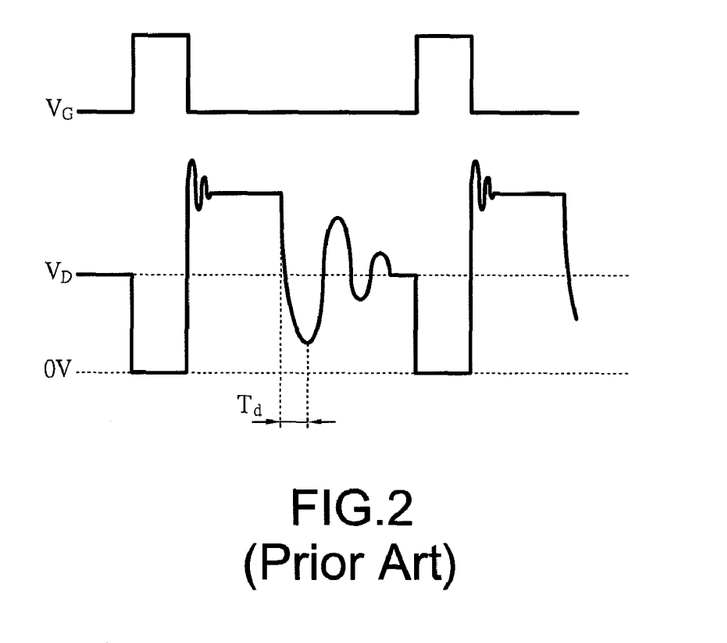
FIG. 2 shows the signal waveforms relevant to the operation of the QR flyback converter in FIG. 1.

FIG. 1 shows a schematic view of a prior art QR flyback converter. FIG. 2 shows the signal waveforms relevant to the operation of the QR flyback converter in FIG. 1. After energy is fully discharged from the secondary winding $N_s$, a resonant is established by a resonant tank consisting of the magnetizing inductor of the primary winding $N_p$ and the parasitic capacitor of the switching device Q in FIG. 1. With reference to FIG. 2, the switching loss of the QR flyback converter can be reduced if the switching device Q is turned on during the valley voltage across the switching device Q. Namely, the switching device Q is turned on by a gate voltage $V_G$ after a delay time $T_d$ is elapsed from the moment the parasitic capacitor of the switching device Q starts to discharge (the onset of the resonant). However, the mass-produced QR flyback converters have difficulty to achieve soft switching at valley voltage of the switching device; therefore, the efficiency of the mass-produced QR flyback converters cannot be guaranteed.

Figure 3:
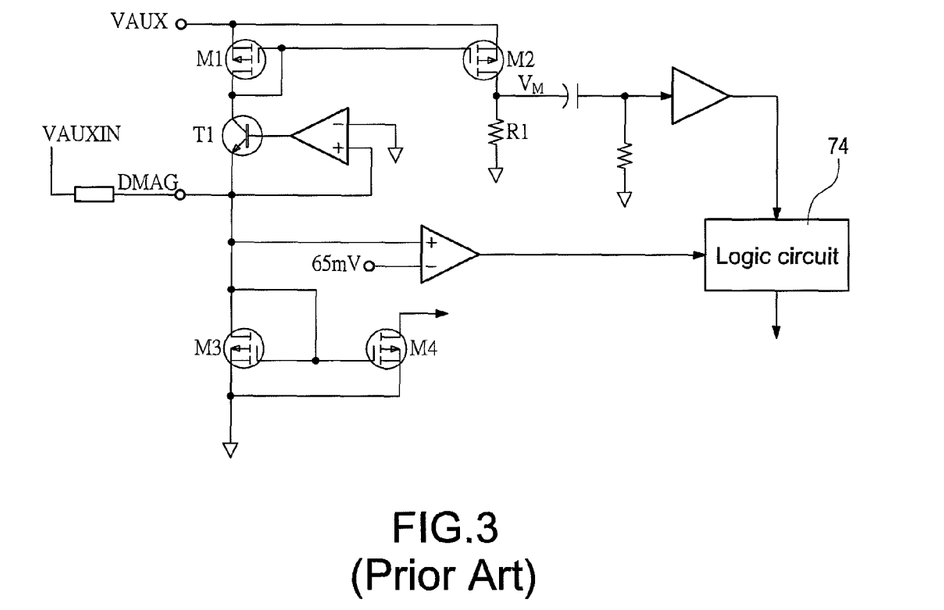
FIG. 3 shows the arrangement for valley voltage detection in a prior flyback converter.

To solve above-mentioned problem, U.S. Pat. No. 5,986,897 discloses a QR flyback converter turning on the switching device at a valley voltage across the switching device. FIG. 3 shows a circuit arrangement for valley voltage detection in U.S. Pat. No. 5,986,897. The circuit arrangement can be employed in the QR flyback converter shown in FIG. 1; therefore, the description thereof will be made with reference also to FIG. 1. In the circuit arrangement of FIG. 3, VAUX is a stable positive voltage source for maintaining operation of the circuit arrangement. When the secondary winding $N_s$ starts to discharge, a voltage signal VAUXIN of an auxiliary winding (not shown) is a positive voltage proportional to the resonant waveform (the resonant waveform is shown, for example, by the curve of the drain voltage $V_D$ in FIG. 1). With reference to FIG. 3, an electric current flows from VAUXIN to node DMAG and then flows to the transistor M3; moreover, the transistor T1 is turned off at this moment. When the energy of the secondary winding $N_s$ is fully discharged, the drain voltage $V_D$ of the switching device Q starts to resonate. At this time, an electric current proportional to the resonant waveform flows from the node DMAG to VAUXIN, a mirrored current flows through the transistor M2, which forms a current mirror with the transistor M1. An inverse signal $V_M$ is generated at the serial circuit of the transistor M2 and the resistor R, and the inverse signal $V_M$ is inversely proportional to the resonant waveform. The inverse signal $V_M$ is at its peak value (maximal value) when the drain voltage $V_D$ of the switching device Q resonates to a valley value (minimal value). The inverse signal $V_M$ triggers the logic circuit 74 to turn on the switching device Q. The circuit arrangement disclosed by this patent triggers the logic circuit 74 at the peak of the inverse signal $V_M$ (corresponding to the valley of the voltage VAUXIN at the auxiliary winding), and then the logic circuit 74 controls the switching of the switching device Q. However, there is a propagation delay between the triggering time and the switching time. Therefore, switching device Q cannot be precisely switched at the resonant valley.

Figure 4:
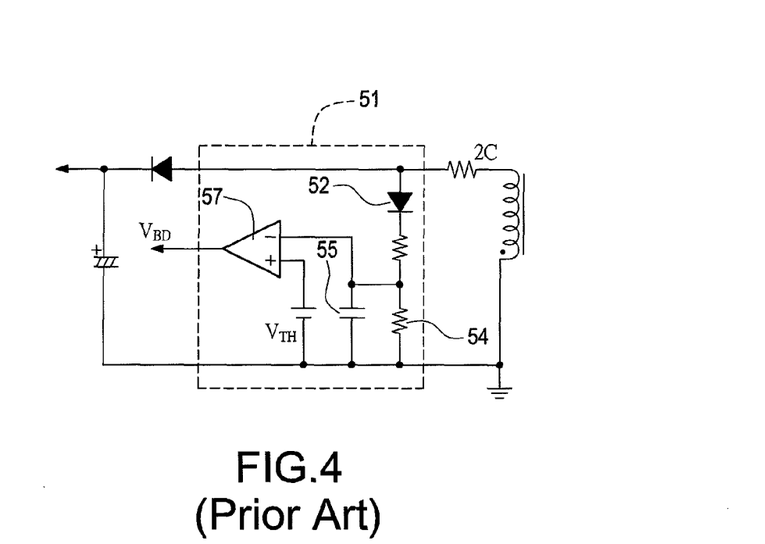
FIG. 4 shows the bottom voltage detector in another prior art flyback converter.

Moreover, U.S. Pat. No. 7,394,670 discloses a valley detection circuit. FIG. 4 shows the bottom voltage detector 51 disclosed in this patent. The bottom voltage detector 51 can be employed in the QR flyback converter shown in FIG. 1; therefore, the description thereof will be made with reference also to FIG. 1. The drain voltage $V_D$ of the switching device Q shown in FIG. 1 starts to resonate when the energy in the secondary winding $N_s$ is fully discharged. The auxiliary winding 2C also has similar waveform with that of the primary winding (not shown). When the drain voltage $V_D$ starts to resonate, the diode 52 is turned off. At this time, the voltage at negative input of the comparator 57 is RC discharged through the capacitor 55 and the resistor 54. The voltage at negative input of the comparator 57 is compared with a threshold voltage $V_{TH}$ to generate a triggering voltage $V_{BD}$. The triggering voltage $V_{BD}$ can be used to switch the switching device Q shown in FIG. 1. In this patent, RC discharging constant is used to provide a constant delay time. However, the control circuits of the mass-produced QR flyback converters generally have different propagation delays, and the constant delay time cannot switch all of the mass-produced QR flyback converters at the resonant valley.

Figure 5:
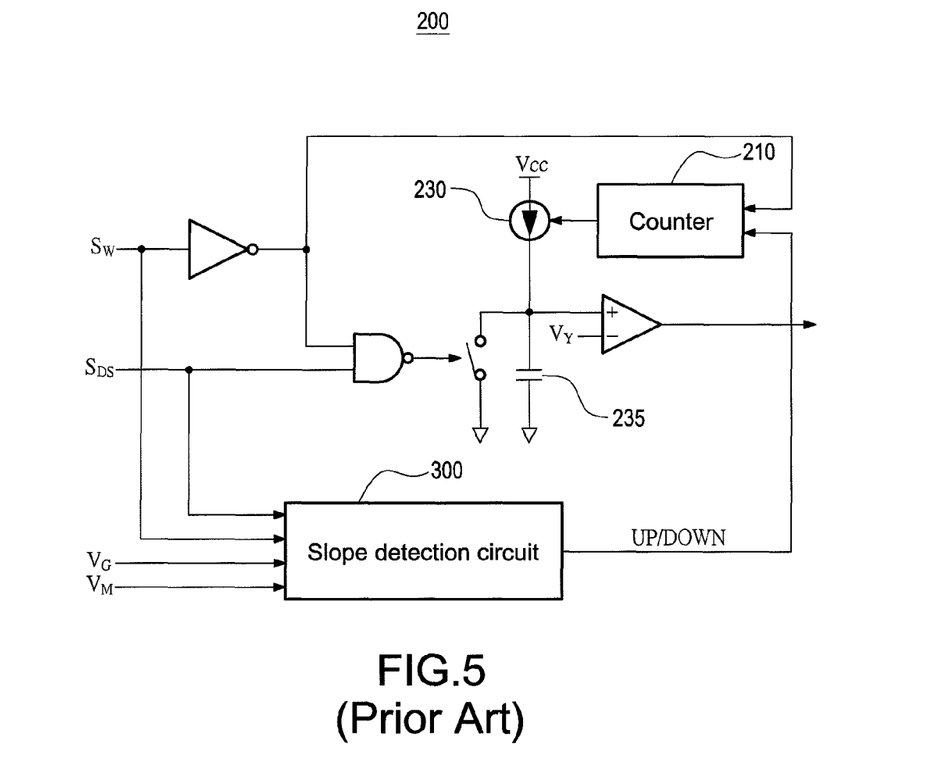
FIG. 5 shows the phase lock circuit according to still another prior art flyback converter.

Moreover, U.S. Pat. No. 7,426,120 and No. 7,466,569 disclose switching control circuit having a valley voltage detector, and a power converter having phase lock circuit for quasi-resonant soft switching, respectively. FIG. 5 shows the circuit diagram of the phase lock circuit 200 disclosed by these patents. The phase lock circuit 200 can be employed in the QR flyback converter shown in FIG. 1 to determine a programmable delay time; therefore, the description thereof will be made with reference also to FIG. 1. In the phase lock circuit 200, a time delay TDLY is determined by the current source 230 and the capacitor 235, and the time delay TDLY is roughly equal to the delay time $T_d$ (from the time drain voltage $V_d$ starts to resonate to the time the resonant valley occurs) shown in FIG. 2. When the time delay TDLY is elapsed and the switching device is to be switched, a slope detection circuit 300 detects the slope of the inverse signal $V_M$ at this moment. When the time delay TDLY is excessively long, the slope detection circuit 300 detects a positive slope in the inverse signal $V_M$. The counter 210 controls the current source 230 to have larger current, thus shortening the time delay TDLY for next cycle. On the contrary, when the time delay TDLY is excessively short, the slope detection circuit 300 detects a negative slope. The counter 210 controls the current source 230 to have smaller current, thus prolonging the time delay TDLY for next cycle. Hence, the time delay TDLY will be automatically adjusted to achieve valley switching. However, the adjustment of the time delay TDLY is realized by the current source 230 and the capacitor 235. It is inevitable for the time delay TDLY to have analog error. More particularly, current source 230 with variable and precise current range is difficult to realize. The capacitor 235 and the comparison voltage $V_Y$ also have manufacture offset. The above-mentioned analog error factors are aggravated for advanced manufacture process, and this makes circuit design more difficult.

Accordingly, the present invention provides a digital dynamic delay modulator and the method thereof for flyback converter to overcome the problems in above-mentioned prior arts.

SUMMARY OF THE INVENTION

It is an object of the present invention to provide a digital dynamic delay modulator for flyback converter, whereby the delay time for switching the flyback converter can be precisely controlled in digital and dynamic manner.

It is another object of the present invention to provide a digital dynamic delay modulating method for flyback converter, whereby the delay time for switching the flyback converter can be precisely controlled in digital and dynamic manner.

Accordingly, the present invention provides a digital dynamic delay modulator for flyback converter. The digital dynamic delay modulator comprises a differentiator, a digital controller and an oscillator. The differentiator receives a first input voltage signal sent from the flyback converter. The digital controller is electrically connected to the differentiator and has a predetermined count number, wherein the predetermined count number is an integer. The oscillator is electrically connected to the digital controller. The digital controller is configured to enable the oscillator when the digital controller receives an initialization signal indicative that the first input voltage signal reaches a threshold voltage, and is configured to perform counting according to the predetermined count number. The digital controller is configured to generate a control signal to turn on a switching device for the flyback converter when the predetermined count number is counted. The differentiator detects a slope of the first input voltage signal when the differentiator receives a second input voltage signal indicative that the switching device is turned on. The digital controller is configured to change the predetermined count number by an integer adjustment according to the slope.

Accordingly, the present invention provides a digital dynamic delay modulating method for flyback converter. The method comprises following steps: (a) receiving a first input voltage signal sent from the flyback converter; (b) comparing the first input voltage signal with a threshold voltage to determine whether a counting condition is matched; (c) starting to count a predetermined count number when the counting condition is matched, wherein the predetermined count number is an integer; (d) sending a first output signal to turn on a switching device when the counting for the predetermined count number is finished; (e) detecting a slope of the first input voltage signal when the switching device is turned on; and (f) using the slope to determine an adjustment for the predetermined count number, wherein the adjustment is an integer.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 6:
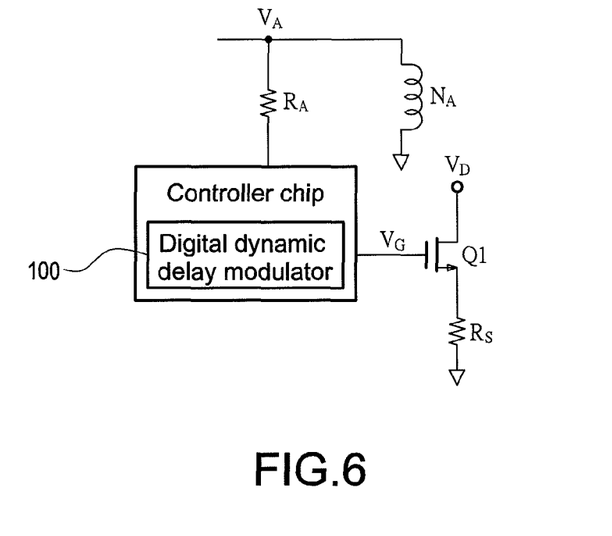
FIG. 6 shows the schematic view of the digital dynamic delay modulator for flyback converter according to a preferred embodiment of the present invention.

FIG. 6 shows the schematic view of the digital dynamic delay modulator 100 for flyback converter according to a preferred embodiment of the present invention. The digital dynamic delay modulator 100 of the present invention can be built in a controller chip of a flyback converter, where the controller chip is electrically connected to an auxiliary winding $N_A$ of a transformer and a switching device Q1. The digital dynamic delay modulator 100 controls the gate voltage for the switching device Q1 according to an extreme value (peak value or valley value) of the voltage signal $V_A$ on the auxiliary winding NA, or other signal replica. The controller chip of the flyback converter further comprises other components such as feedback control unit and switch controller for generating the gate voltage for the switching device Q1. Those components are well known to those skilled in the related art, and the detailed descriptions thereof are omitted here for brevity.

Figure 7:
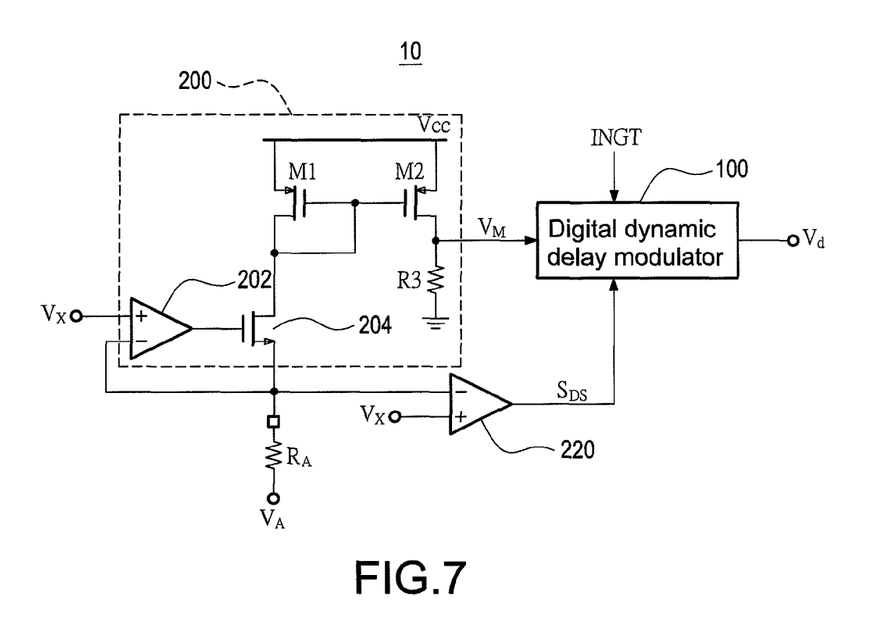
FIG. 7 shows a schematic view for the application of the digital dynamic delay modulator to a digital dynamic delay system.

FIG. 7 is a schematic view showing the application of the digital dynamic delay modulator 100 to a digital dynamic delay system 10. The digital dynamic delay system 10 comprises a current-to-voltage converter 200, an initialization-signal generator 220 and the digital dynamic delay modulator 100. The initialization-signal generator 220 can be implemented, for example, by a comparator. A negative input of the initialization-signal generator 220 is electrically connected to a resistor $R_A$ to receive the voltage signal $V_A$, where the voltage signal $V_A$ is proportional to the resonate waveform of the switching device Q1. The initialization-signal generator 220 generates an initialization signal $S_{DS}$ by comparing the voltage signal $V_A$ with a threshold voltage $V_X$.

The operational amplifier 202 of the current-to-voltage converter 200 has a positive input for receiving the threshold voltage $V_X$ and has a negative input coupled to the resistor $R_A$ for receiving the voltage signal $V_A$. Moreover, the output of the operational amplifier 202 controls the gate of the MOS transistor 204. The source of the MOS transistor 204 is electrically connected to the resistor $R_A$. The MOS transistor M1 and the MOS transistor M2 constitute a current mirror circuit, where the MOS transistor M1 is coupled to the resistor $R_A$ through the MOS transistor 204, and the MOS transistor M2 is further electrically connected to a resistor R3. The output of the operational amplifier 202 controls open/close of the MOS transistor 204. When the MOS transistor 204 is turned on, the current-to-voltage converter 200 generates an inverse signal $V_M$ in response to the current flowing through the resistor $R_A$, where the inverse signal $V_M$ is inversely proportional to the voltage signal $V_A$.

The digital dynamic delay modulator 100 is electrically connected to the current-to-voltage converter 200 and the initialization-signal generator 220. When the switching device Q1 is turned off, the digital dynamic delay modulator 100 is triggered by the initialization signal $S_{DS}$ to sense the peak in the inverse signal $V_M$. The digital dynamic delay modulator 100 generates a first output signal (hereinafter, referred to as control signal) $V_d$ according to the peak in the inverse signal $V_M$, and sends the control signal $V_d$ to a switch controller (not shown) in the controller chip to turn on the switching device Q1. The voltage signal $V_A$ on the auxiliary winding $N_A$ is proportional to the drain voltage $V_D$ across the switching device Q1. By the digital delay control of the digital dynamic delay modulator 100, the switching device Q1 can be turned on at the valley voltage thereof (corresponding to the peak voltage of the inverse signal $V_M$).

Figure 8:
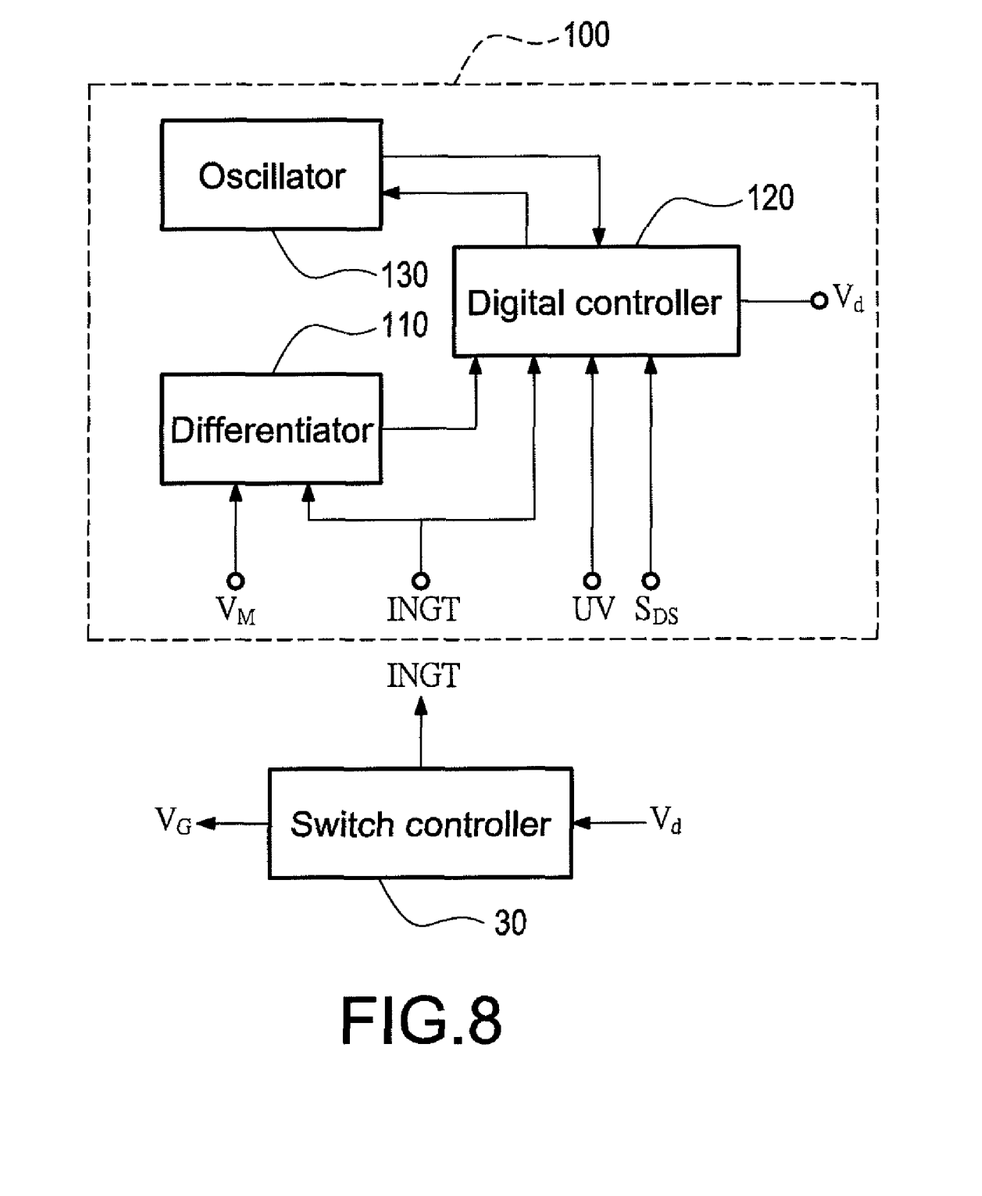
FIG. 8 shows the schematic view of the digital dynamic delay modulator according to the present invention.

FIG. 8 shows the schematic view of the digital dynamic delay modulator 100 according to the present invention. The digital dynamic delay modulator 100 mainly comprises a differentiator 110, a digital controller 120 and an oscillator 130. When the energy of the secondary winding of the transformer is exhausted and the voltage signal $V_A$ starts to resonate downward, an inverse signal $V_M$ inversely proportional to the voltage signal VA is produced by the current mirror circuit (M1, M2) and the inverse signal $V_M$ is coupled to the differentiator 110. Moreover, the initialization signal $S_{DS}$ is generated when the voltage signal $V_A$ resonates downward to be the value as the threshold voltage $V_X$. Triggered by the initialization signal $S_{DS}$, the digital controller 120 enables the oscillator 130 to generate pulses and the digital controller 120 counts the pulses of the oscillator 130 according to a predetermined count number N, where N is an integer. The digital controller 120 generates the control signal $V_d$ to inform the switch controller 30 for the switching device Q1 when a delay time corresponding to the predetermined count number N is elapsed (namely, the digital controller 120 had counted N pulses from the oscillator 130). The switch controller 30 turns on the switching device Q1 upon receiving the control signal $V_d$. Moreover, the switch controller 30 sends a feedback signal INGT to the differentiator 110 and the digital controller 120 when the switch controller 30 is to turn on the switching device Q1. As can be seen from above description, the delay time for achieving quasi resonance is relevant to the pulse period of the oscillator 130 and the predetermined count number N. When the pulse period of the oscillator 130 is constant, the delay time can be dynamically and digitally adjusted by controlling the count number N. The differentiator 110 detects the slope of the inverse signal $V_M$ when it receives the feedback signal INGT and then generates a count control signal to the digital controller 120.

When the delay time is excessively long, the digital controller 120 is controlled by the count control signal to subtract the predetermined count number N by a predetermined decrement M (M>=1 and is an integer) to obtain a new count number (N−M). On the contrary, when the delay time is excessively short, the digital controller 120 is controlled by the count control signal to add the predetermined count number N by a predetermined increment P (P>=1 and is an integer) to obtain a new count number (N+P). In the above mentioned manner, the delay time can be dynamically and digitally controlled.

Figure 9:
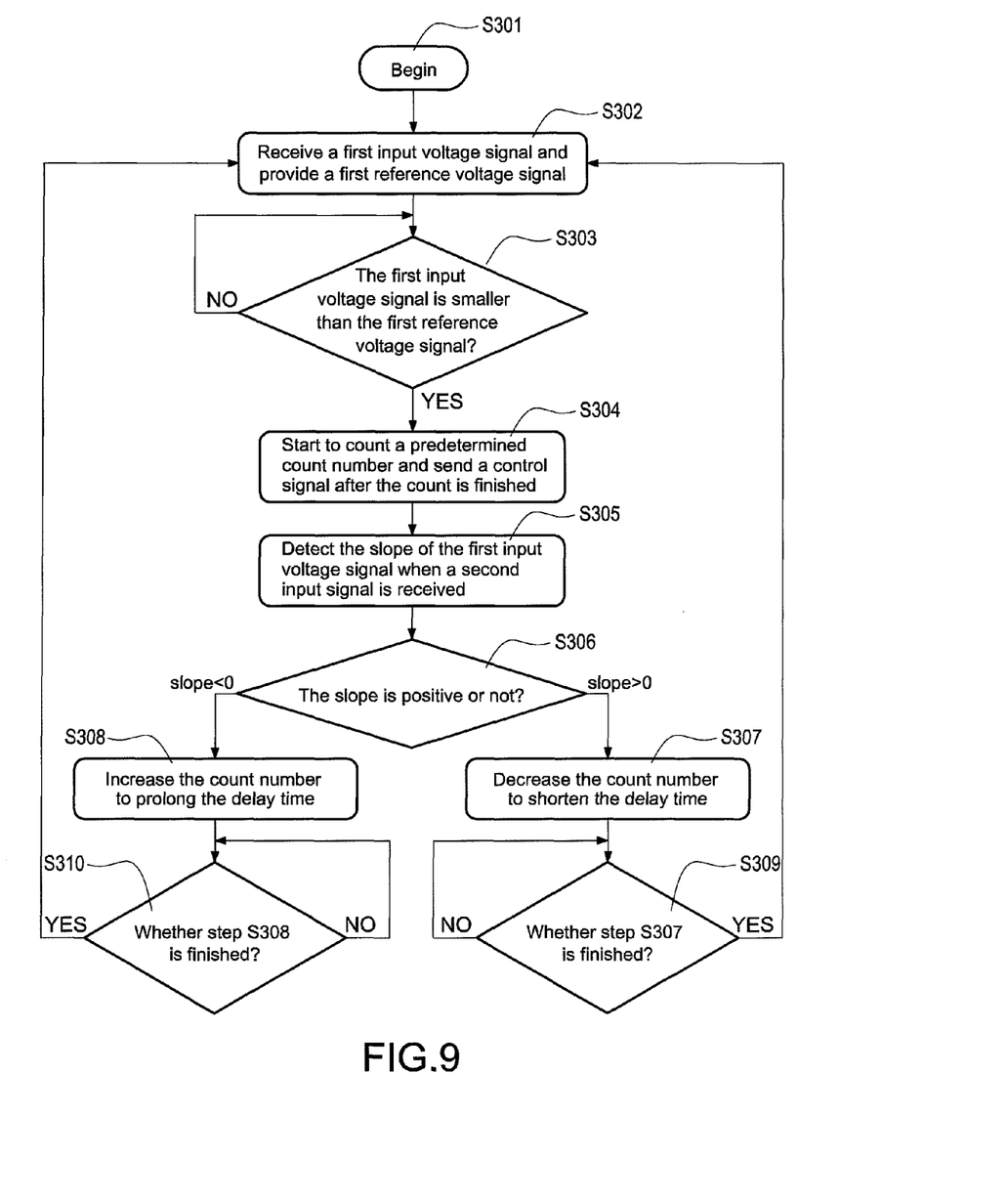
FIG. 9 shows a flowchart of the digital dynamic delay modulating method according to the present invention.

FIG. 9 shows a flowchart of the digital dynamic delay modulating method according to the present invention, where the digital dynamic delay modulator 100 is operated according to this method. After the procedure begins (S301), the digital dynamic delay modulator 100 receives a first input voltage signal (for example, the voltage signal $V_A$) and a first reference voltage signal (namely, the threshold voltage $V_X$) at step S302. The digital dynamic delay modulator 100 compares the first input voltage signal with the first reference voltage signal at step S303. When the first input voltage signal is smaller than the first reference voltage signal, it means that the voltage signal $V_A$ starts to resonate downward. After step S303, when the first input voltage signal is smaller than the first reference voltage signal, the digital controller 120 starts to count a predetermined count number N for pulses sent from the oscillator 130, where N is an integer. After the count is finished, the digital controller 120 sends a control signal $V_d$ to inform a switch controller for the switching device Q1 at step S304. The switch controller turns on the switching device Q1 and generates a feedback signal INGT for sending to the digital dynamic delay modulator 100 when the switch controller receives the control signal $V_d$. At step S305, the digital dynamic delay modulator 100 detects the slope of the first input voltage signal when it receives a second input signal (namely, the feedback signal INGT). The digital dynamic delay modulator 100 judges whether the slope detected in step S305 is positive or not (S306). When the slope of the first input voltage signal is positive, it means that the delay time is excessive and the digital dynamic delay modulator 100 decreases the count number N to shorten the delay time at step S307. When the slope of the first input voltage signal is negative, it means that the delay time is not long enough and the digital dynamic delay modulator 100 increases the count number N to prolong the delay time at step S308.

Moreover, when the first input voltage signal at step S302 is the inverse signal $V_M$, the logical operations at steps S303 and S306 are performed in opposite way. At step S303, the following step S304 is performed only if the first input voltage signal (the inverse signal $V_M$) is larger than the first reference voltage signal. At step 306, the count number N is increased to prolong delay time when the slope of the first input voltage signal (the inverse signal $V_M$) is positive. At step 306, the count number N is decreased to shorten delay time when the slope of the first input voltage signal (the inverse signal $V_M$) is negative.

With reference again to FIG. 8, due to a propagation delay between the digital controller 120 and the switch controller 30, the issuance of the control signal $V_d$ from the digital controller 120 and the generation of signal $V_G$ (to turn on the switching device Q1) cannot be synchronous. The switch controller 30 sends the feedback signal INGT to inform the digital controller 120 of the turning-on of the switching device Q1. Based on the detected slope of the voltage signal $V_A$ or the inverse signal $V_M$ (the inverse replica of the voltage signal $V_A$), the digital controller 120 adjusts the delay time in digital manner by increasing/decreasing the count number N. Therefore, the analog error annoying the prior art flyback converter can be minimized.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A digital dynamic delay modulator for flyback converter, comprising:
   a differentiator receiving a first input voltage signal sent from the flyback converter;
   a digital controller electrically connected to the differentiator and having a predetermined count number, wherein the predetermined count number is an integer; and
   an oscillator electrically connected to the digital controller, wherein the digital controller is configured to enable the oscillator when the digital controller receives an initialization signal indicative that the first input voltage signal reaches a threshold voltage, and is configured to perform counting according to the predetermined count number, the digital controller is configured to generate a first output signal to turn on a switching device for the flyback converter when the predetermined count number is counted;

wherein the differentiator detects a slope of the first input voltage signal when the differentiator receives a second input voltage signal indicative that the switching device is turned on, the digital controller is configured to change the predetermined count number by an integer adjustment according to the slope.

2. The digital dynamic delay modulator in claim 1, wherein the first input voltage signal is a voltage signal on an auxiliary winding of the flyback converter, the digital controller is configured to subtract the predetermined count number by a predetermined decrement when the slope is positive, wherein the predetermined decrement is equal to or larger than 1.

3. The digital dynamic delay modulator in claim 1, wherein the first input voltage signal is a voltage signal on an auxiliary winding of the flyback converter, the digital controller is configured to add the predetermined count number by a predetermined increment when the slope is negative, wherein the predetermined increment is equal to or larger than 1.

4. The digital dynamic delay modulator in claim 1, wherein the first input voltage signal is an inverse signal inversely proportional to a voltage signal on an auxiliary winding of the flyback converter, the digital controller is configured to subtract the predetermined count number by a predetermined decrement when the slope is negative, wherein the predetermined decrement is equal to or larger than 1.

5. The digital dynamic delay modulator in claim 1, wherein the first input voltage signal is an inverse signal inversely proportional to a voltage signal on an auxiliary winding of the flyback converter, the digital controller is configured to add the predetermined count number by a predetermined increment when the slope is positive, wherein the predetermined increment is equal to or larger than 1.

6. A digital dynamic delay modulating method for flyback converter, comprising:
  (a) receiving a first input voltage signal sent from the flyback converter;
  (b) comparing the first input voltage signal with a threshold voltage to determine whether a counting condition is matched;
  (c) starting to count a predetermined count number when the counting condition is matched, wherein the predetermined count number is an integer;
  (d) sending a first output signal to turn on a switching device when the counting for the predetermined count number is finished;
  (e) detecting a slope of the first input voltage signal when the switching device is turned on; and
  (f) using the slope to determine an adjustment for the predetermined count number, wherein the adjustment is an integer.

7. The method in claim 6, wherein the first input voltage signal is a voltage signal on an auxiliary winding of the flyback converter, the counting for the predetermined count number is started when the voltage signal is smaller than the threshold voltage.

8. The method in claim 6, wherein at step (f) the predetermined count number is subtracted by a predetermined decrement when the slope is positive, wherein the predetermined decrement is equal to or larger than 1.

9. The method in claim 7, wherein at step (f) the predetermined count number is subtracted by a predetermined decrement when the slope is positive, wherein the predetermined decrement is equal to or larger than 1.

10. The method in claim 6, wherein at step (f) the predetermined count number is added by a predetermined increment when the slope is negative, wherein the predetermined increment is equal to or larger than 1.

11. The method in claim 7, wherein at step (f) the predetermined count number is added by a predetermined increment when the slope is negative, wherein the predetermined increment is equal to or larger than 1.

12. The method in claim 6, wherein the first input voltage signal is an inverse signal inversely proportional to a voltage signal on an auxiliary winding of the flyback converter, the counting for the predetermined count number is started when the inverse signal is larger than the threshold voltage.

13. The method in claim 12, wherein at step (f) the predetermined count number is subtracted by a predetermined decrement when the slope is negative, wherein the predetermined decrement is equal to or larger than 1.

14. The method in claim 12, wherein at step (f) the predetermined count number is added by a predetermined increment when the slope is positive, wherein the predetermined increment is equal to or larger than 1.

* * * * *